(12) United States Patent
Wit et al.

(10) Patent No.: US 7,893,141 B2
(45) Date of Patent: Feb. 22, 2011

(54) HALOGEN-FREE FLAME RETARDANT POLYESTER

(75) Inventors: Gerrit De Wit, Ossendrecht (NL); Gaurav Mediratta, Bangalore (IN)

(73) Assignee: SABIC Innovative Plastics IP B.V., Pittsfield, MA (US)

( * ) Notice: Subject to any disclaimer, the term of this patent is extended or adjusted under 35 U.S.C. 154(b) by 1273 days.

(21) Appl. No.: 10/954,898

(22) Filed: Sep. 30, 2004

(65) Prior Publication Data

US 2006/0074155 A1 Apr. 6, 2006

(51) Int. Cl.
*C08K 5/49* (2006.01)

(52) U.S. Cl. .................. 524/99; 524/100; 524/126; 524/127; 524/133; 524/140; 524/141; 524/414; 524/416; 524/425; 524/456

(58) Field of Classification Search ........... 524/99–100, 524/115–154, 414–416, 425, 456
See application file for complete search history.

(56) References Cited

U.S. PATENT DOCUMENTS

| | | | |
|---|---|---|---|
| 2,465,319 A | 3/1949 | Whinfield | |
| 4,203,888 A | 5/1980 | Rashbrook | |
| 4,672,086 A | 6/1987 | Seiler et al. | |
| 5,135,971 A * | 8/1992 | Steiert et al. | 524/80 |
| 5,367,011 A | 11/1994 | Walsh | |
| 5,411,999 A | 5/1995 | Gallucci | |
| 5,770,644 A * | 6/1998 | Yamamoto et al. | 524/120 |
| 6,174,943 B1 | 1/2001 | Matsumoto et al. | |
| 6,248,814 B1 * | 6/2001 | Hironaka et al. | 524/80 |
| 6,277,905 B1 * | 8/2001 | Keep | 524/94 |
| 6,384,128 B1 | 5/2002 | Wadahara et al. | |
| 6,414,084 B1 | 7/2002 | Adedeji | |
| 6,547,992 B1 | 4/2003 | Schlosser et al. | |
| 6,759,460 B2 * | 7/2004 | Kamo et al. | 524/100 |
| 6,790,886 B2 * | 9/2004 | Harashina et al. | 524/116 |
| 6,946,578 B2 * | 9/2005 | Nakano et al. | 568/8 |
| 7,148,276 B2 * | 12/2006 | Bauer et al. | 524/126 |
| 2002/0096669 A1 | 7/2002 | Van Der Spek et al. | |
| 2002/0115759 A1 * | 8/2002 | Eckel et al. | 524/115 |
| 2004/0049063 A1 | 3/2004 | Hoerold | |
| 2004/0147646 A1 | 7/2004 | Harashina et al. | |

FOREIGN PATENT DOCUMENTS

| | | |
|---|---|---|
| DE | 19837701 | 2/2000 |
| DE | 19920276 | 11/2000 |
| EP | 0321126 | 6/1989 |
| EP | 0604080 | 6/1994 |
| EP | 0661342 | 7/1995 |
| EP | 0791634 | 8/1997 |
| EP | 0985706 | 3/2000 |
| EP | 1452567 | 9/2004 |
| JP | 05-247428 * | 9/1993 |
| JP | 06157880 A | 6/1994 |
| JP | 7188520 | 7/1995 |
| JP | 9124908 | 5/1997 |
| JP | 3115195 B2 | 12/2000 |

* cited by examiner

*Primary Examiner*—Peter Szekely

(57) ABSTRACT

Novel polyester composition comprising a polyester, wherein said polyester comprises structural units derived from substituted or unsubstituted diacid or diester, a substituted or unsubstituted diol; a phosphorus containing compound and at least one selected from a stabilizer and an organic compound comprising at least one functional group is been disclosed. In addition methods for the preparation of the polyester composition and articles derived from said composition is disclosed.

20 Claims, No Drawings

US 7,893,141 B2

HALOGEN-FREE FLAME RETARDANT POLYESTER

BACKGROUND OF THE INVENTION

This invention relates to copolymers, more particularly to polyesters of the polyesters with phosphorus containing compounds, which have enhanced heat stability.

Many applications of engineering plastics require polymers that have long term heat stability along with other properties such as tensile strength and chemical resistance. Conventional commercial polyesters generally have good long term heat stability, and possess other desired property attributes such as excellent mechanical properties, good surface finishes of molded articles and satisfactory chemical resistance. It has been shown however than halogen-free flame retardant polyester formulations based on organic P-compounds have often no good long term heat stability properties.

Several attempts have been made to prepare halogen-free flame retardant polyester formulations. It has been known in the past the process to make polyesters flame retardant by using halogen-free flame retardants based on P-containing and N-containing compounds. The JP06157880 describes filled polyesters containing melamine cyanurate and an aromatic phosphate and JP3115195 polyester with N-heterocyclic compounds and a polyfunctional group compound and optionally a P-based flame retardant. The U.S. Pat. No. 4,203,888 teaches polyester with organic diphosphates. However the polyester compositions possess no good thermal stability especially on prolonged heat aging. There is a need for polyesters having improved long term heat aging characteristics.

There is a continuing need to provide a novel halogen-free flame retardant polyester material having improved long term heat resistance, processability, mechanical strength and moldability properties.

BRIEF DESCRIPTION OF THE INVENTION

According to one embodiment of the present invention a polyester composition comprising: a polyester, wherein said polyester comprises structural units derived from substituted or unsubstituted diacid or diester, a substituted or unsubstituted diol, a phosphorus containing compound, and at least one compound selected from a mineral-like stabilizer and an organic compound comprising at least one functional group is disclosed. The mineral like stabilizer is at least one selected from the group of calcium hydroxyapatite, boehmite, calcium carbonate, barium carbonate, calcium sulfate, barium sulfate, calcium hydrogenphosphate, barium hydrogenphosphate, calcium(meta)borate, barium(meta)borate, hydrotalcite, aluminium phosphate, wollastonite, dolomite, calcium titanate, barium titanate and the organic compound comprising at least one function group is at least one selected from the group consisting of epoxy, carbodiimide, orthoesters, anhydrides, oxazoline and imidazoline.

In one embodiment of the present invention is disclosed the method of synthesizing the polyester articles derived from said composition. Also disclosed is a thermoplastic resin composition comprising structural units derived from substituted or unsubstituted polymer resin and the polyester of the present invention.

Various other features, aspects, and advantages of the present invention will become more apparent with reference to the following description, examples, and appended claims.

DETAILED DESCRIPTION OF THE INVENTION

The present invention may be understood more readily by reference to the following detailed description of preferred embodiments of the invention and the examples included herein. In this specification and in the claims, which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester.

As used herein the term "aliphatic radical" refers to a radical having a valence of at least one comprising a linear or branched array of atoms which is not cyclic. The array may include heteroatoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which may be present on an aliphatic radical include but are not limited to halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —CH$_2$CHBrCH$_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —CONH$_2$), carbonyl, dicyanoisopropylidene (i.e. —CH$_2$C(CN)$_2$CH$_2$—), methyl (i.e. —CH$_3$), methylene (i.e. —CH$_2$—), ethyl, ethylene, formyl, hexyl, hexamethylene, hydroxymethyl (i.e. —CH$_2$OH), mercaptomethyl (i.e. —CH$_2$SH), methylthio (i.e. —SCH$_3$), methylthiomethyl (i.e. —CH$_2$SCH$_3$), methoxy, methoxycarbonyl, nitromethyl (i.e. —CH$_2$NO$_2$), thiocarbonyl, trimethylsilyl, t-butyldimethylsilyl, trimethyoxysilylpropyl, vinyl, vinylidene, and the like. Aliphatic radicals are defined to comprise at least one carbon atom. A C$_1$-C$_{10}$ aliphatic radical includes substituted aliphatic radicals and unsubstituted aliphatic radicals containing from at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen or may be composed exclusively of carbon and hydrogen. As used herein the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2

"delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_4$) fused to a nonaromatic component —$(CH_2)_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which may be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —$OPhC(CF_3)_2PhO$—), chloromethylphenyl; 3-trifluorovinyl-2-thienyl; 3-trichloromethylphenyl (i.e. 3-$CCl_3Ph$—), bromopropylphenyl (i.e. $BrCH_2CH_2CH_2Ph$—), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. $H_2NPh$—), aminocarbonylphenyl (i.e. $NH_2COPh$—), 4-benzoylphenyl, dicyanoisopropylidenebis(4-phenyloxy) (i.e. —$OPhC(CN)_2PhO$—), 3-methylphenyl, methylenebis(4-phenyloxy) (i.e. —$OPhCH_2PhO$—), ethylphenyl, phenylethenyl, 3-formyl-2-thienyl, 2-hexyl-5-furanyl; hexamethylene-1,6-bis(4-phenyloxy) (i.e. —$OPh(CH_2)_6PhO$—); 4-hydroxymethylphenyl (i.e. 4-$HOCH_2Ph$—), 4-mercaptomethylphenyl (i.e. 4-$HSCH_2Ph$—), 4-methylthiophenyl (i.e. 4-$CH_3SPh$—), methoxyphenyl, methoxycarbonylphenyloxy (e.g. methyl salicyl), nitromethylphenyl (i.e. —$PhCH_2NO_2$), trimethylsilylphenyl, t-butyldimethylsilylphenyl, vinylphenyl, vinylidenebis(phenyl), and the like. The term "a $C_3$-$C_{10}$ aromatic radical" includes substituted aromatic radicals and unsubstituted aromatic radicals containing from at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethy group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. Cycloaliphatic radicals may be "substituted" or "unsubstituted". A substituted cycloaliphatic radical is defined as an cycloaliphatic radical which comprises at least one substituent. A substituted cycloaliphatic radical may comprise as many substituents as there are positions available on the cycloaliphatic radical for substitution. Substituents which may be present on an cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —$OC_6H_{11}C(CF_3)_2C_6H_{11}O$—), chloromethylcyclohexyl; 3-trifluorovinyl-2-cycloprpyl; 3-trichloromethylcyclohexylyl (i.e. 3-$CCl_3C_6H_{11}$—), bromopropylcyclohexyl (i.e. $BrCH_2CH_2CH_2C_6H_{11}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. $H_2NC_6H_{11}$—), aminocarbonylcyclopenyl (i.e. $NH_2COC_5H_9$—), 4-acetyloxycyclohexyl, dicyanoisopropylidenebis(4-cyclohexyloxy) (i.e. —$OC_6H_{11}C(CN)_2C_6H_{11}O$—), 3-methylcyclohexyl, methylenebis(4-cyclohexyloxy) (i.e. —$OC_6H_{11}CH_2C_6H_{11}O$—), ethylcyclobutyl, cyclopropylethenyl, 3-formyl-2-terahydrofuranyl, 2-hexyl-5-tetrahydrofuranyl; hexamethylene-1,6-bis (4-cyclohexyloxy) (i.e. —$OC_6H_{11}(CH_2)_6C_6H_{11}O$—); 4-hydroxymethylcyclohexyl (i.e. 4-$HOCH_2C_6H_{11}$—), 4-mercaptomethylcyclohexyl (i.e. 4-$HSCH_2C_6H_{11}$—), 4-methylthiocyclohexyl (i.e. 4-$CH_3SC_6H_{11}$—), 4-methoxycyclohexyl, 2-methoxycarbonylcyclohexyloxy (2-$CH_3OCOC_6H_{11}O$—), nitromethylcyclohexyl (i.e. —$C_6H_{11}CH_2NO_2$), trimethylsilylcyclohexyl, t-butyldimethylsilylcyclopentyl, 4-trimethoxysilyethylcyclohexyl (e.g. $(CH_3O)_3SiCH_2CH_2C_6H_{11}$—), vinylcyclohexenyl, vinylidenebis(cyclohexyl), and the like. The term "a $C_3$-$C_{10}$ cycloaliphatic radical" includes substituted cycloaliphatic radicals and unsubstituted cycloaliphatic radicals containing from at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_7H_{13}$—) represents a $C_7$ cycloaliphatic radical.

The term "alkyl" as used in the various embodiments herein is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples C1-C32 alkyl optionally substituted with one or more groups selected from C1-C32 alkyl, C3-C15 cycloalkyl or aryl; and C3-C15 cycloalkyl optionally substituted with one or more groups selected from C1-C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include $C_6$-$C_{15}$ aryl optionally substituted with one or more groups selected from $C_1$-$C_{32}$ alkyl, $C_3$-$C_{15}$ cycloalkyl or aryl. Some particular illustrative examples of aryl radicals comprise substituted or unsubstituted phenyl, biphenyl, toluyl and naphthyl.

The present inventors have unexpectedly discovered a polyester composition comprising: a polyester, wherein said polyester comprises structural units derived from substituted or unsubstituted diacid or diester, a substituted or unsubstituted diol, a phosphorus containing compound, and at least one compound selected from a mineral-like stabilizer and an organic compound comprising at least one functional group. The mineral like stabilizer is at least one selected from the group of Calcium hydroxyapatite, boehmite, calcium carbonate, barium carbonate, Calcium sulfate, barium sulfate, calcium hydrogenphosphate, barium hydrogenphosphate, calcium (meta)borate, barium (meta)borate, hydrotalcite, aluminium phosphate, wollastonite, dolomite, calcium titanate, barium titanate the organic compound comprising at least one functional group is at least one selected from the group consisting of epoxy, carbodiimide, orthoesters, anhydrides, oxazoline, imidazoline.

Typically such polyester resins include crystalline polyester resins such as polyester resins derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units according to structural formula (I)

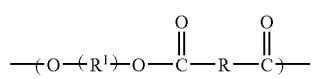

wherein, $R^1$ is an alkyl radical compromising a dehydroxylated residue derived from an aliphatic or cycloaliphatic diol, or mixtures thereof, containing from 2 to about 20 carbon atoms. R is an aryl radical comprising a decarboxylated residue derived from an aromatic dicarboxylic acid. In one embodiment of the present invention the polyester could be an aliphatic polyester where at least one of $R^1$ or R is a cycloalkyl containing radical. The polyester is a condensation product where $R^1$ is the residue of an aryl, alkane or cycloalkane containing diol having 6 to 20 carbon atoms or chemical equivalent thereof, and R is the decarboxylated residue derived from an aryl, aliphatic or cycloalkane containing diacid of 6 to 20 carbon atoms or chemical equivalent thereof. The polyester resins are typically obtained through the condensation or ester interchange polymerization of the diol or diol equivalent component with the diacid or diacid chemical equivalent component.

The diacids meant to include carboxylic acids having two carboxyl groups each useful in the preparation of the polyester resins of the present invention are preferably aliphatic, aromatic, cycloaliphatic. Examples of diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue R may be derived are acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

Examples of the polyvalent carboxylic acid include, but are not limited to, an aromatic polyvalent carboxylic acid, an aromatic oxycarboxylic acid, an aliphatic dicarboxylic acid, and an alicyclic dicarboxylic acid, including terephthalic acid, isophthalic acid, ortho-phthalic acid, 1,5-naphthalenedicarboxyli acid, 2,6-naphthalenedicarboxylic acid, diphenic acid, sulfoterephthalic acid, 5-sulfoisophthalic acid, 4-sulfophthalic acid, 4-sulfonaphthalene 2,7-dicarboxylic acid, 5-[4-sulfophenoxy] isophthalic acid, sulfoterephthalic acid, p-oxybenzoic acid, p-(hydroxyethoxy)benzoic acid, succinic acid, adipic acid, azelaic acid, sebacic acid, dodecanedicarboxylic acid, fumaric acid, maleic acid, itaconic acid, hexahydrophthalic acid, tetrahydrophthalic acid, trimellitic acid, trimesic acid, and pyrromellitic acid. These may be used in the form of metal salts and ammonium salts and the like.

Some of the diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably, a cycloaliphatic diol or chemical equivalent thereof and particularly 1,4-cyclohexane dimethanol or its chemical equivalents are used as the diol component. Chemical equivalents to the diols include esters, such as dialkylesters, diaryl esters, and the like.

Examples of the polyvalent alcohol include, but are not limited to, an aliphatic polyvalent alcohol, an alicyclic polyvalent alcohol, and an aromatic polyvalent alcohol, including ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2, 4-trimethyl-1, 3-pentanediol, polyethylene glycol, polypropylene glycol, polytetramethylene glycol, trimethylolethane, trimethylolpropane, glycerin, pentaerythritol, 1,4- cyclohexanediol, 1,4-cyclohexanedimethanol, spiroglycol, tricyclodecanediol, tricyclodecanedimethanol, m-xylene glycol, o-xylene glycol, 1,4-phenylene glycol, bisphenol A, lactone polyester and polyols. Further, with respect to the polyester resin obtained by polymerizing the polybasic carboxylic acids and the polyhydric alcohols either singly or in combination respectively, a resin obtained by capping the polar group in the end of the polymer chain using an ordinary compound capable of capping an end can also be used.

Typically the polyester resin may comprise one or more resins selected from linear polyester resins, branched polyester resins and copolymeric polyester resins. Suitable linear polyester resins include, e.g., poly(alkylene phthalate)s such as, e.g., poly(ethylene terephthalate) ("PET"), poly(butylene terephthalate) ("PBT"), poly(propylene terephthalate) ("PPT"), poly(cycloalkylene phthalate)s such as, e.g., poly (cyclohexanedimethanol terephthalate) ("PCT"), poly(alkylene naphthalate)s such as, e.g., poly(butylene-2,6-naphthalate) ("PBN") and poly(ethylene-2,6-naphthalate) ("PEN"), poly(alkylene dicarboxylate)s such as, e.g., poly(butylene dicarboxylate).

The polyesters in one embodiment of the present invention may be a polyether ester block copolymer consisting of a thermoplastic polyester as the hard segment and a polyalkylene glycol as the soft segment. It may also be a three-component copolymer obtained from at least one dicarboxylic acid selected from: aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethanedicarboxylic acid or 3-sulfoisophthalic acid, alicyclic dicarboxylic acids such as 1,4-cyclohexanedicarboxylic acid, aliphatic dicarboxylic acids such as succinic acid, oxalic acid, adipic acid, sebacic acid, dodecanedicarboxylic acid or dimeric acid, and ester-forming derivatives thereof; at least one diol selected from: aliphatic diols such as 1,4-butanediol, ethylene glycol, trimethylene glycol, tetramethylene glycol, pentamethylene glycol, hexamethylene glycol, neopentyl glycol or decamethylene glycol, alicyclic diols such as 1,1-cyclohexanedimethanol, 1,4-cyclohexanedimethanol or tricyclodecanedimethanol, and ester-forming derivatives thereof; and at least one poly(alkylene oxide)glycol selected from: polyethylene glycol or poly(1,2- and 1,3-propylene oxide)glycol with an average molecular weight of about 400-5000, ethylene oxide-propylene oxide copolymer, and ethylene oxide-tetrahydrofuran copolymer.

In one embodiment of the present invention the polyester is an aliphatic polyester where at least one of $R^1$ or R is a cycloalkyl containing radical. In one embodiment at least one $R^1$ or R is cycloaliphatic. Preferred polyesters of the invention will have both $R^1$ and R cycloaliphatic. In one embodiment the present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mol % of cyclic diacid and/or cyclic diol components, the remainder, if any, being linear aliphatic diacids and/or diols. The cyclic components are necessary to impart good rigidity to the polyester and to allow the formation of transparent blends due to favorable interaction with the polycarbonate resin.

In one embodiment the $R^1$ and R are cycloalkyl radicals independently selected from the following formula (II):

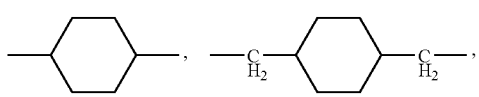

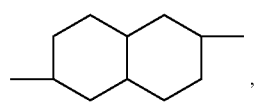

-continued

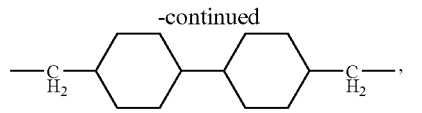

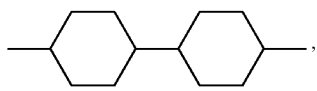

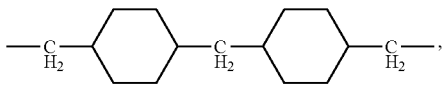

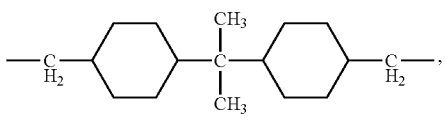

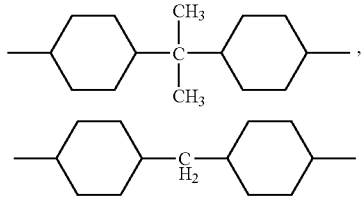

The cycloaliphatic radical R is derived from the 1,4-cyclohexyl diacids and most preferably greater than 70 mol % thereof in the form of the trans isomer. The preferred cycloaliphatic radical is derived from the 1,4-cyclohexyl primary diols such as 1,4-cyclohexyl dimethanol, most preferably more than 70 mol % thereof in the form of the trans isomer.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well. When the mixture of isomers or more than one diacid or diol is used, a copolyester or a mixture of two polyesters may be used as the present cycloaliphatic polyester resin.

In one embodiment the cycloaliphatic polyester is poly(cyclohexane-1,4-dimethylene cyclohexane-1,4-dicarboxylate) also referred to as poly(1,4-cyclohexane-dimethanol 1,4-dicarboxylate) (PCCD) which has recurring units of formula III:

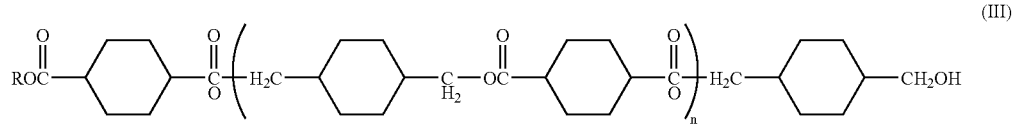

With reference to the previously set forth general formula, for PCCD, is derived from 1,4 cyclohexane dimethanol; and a cyclohexane ring derived from cyclohexanedicarboxylate or a chemical equivalent thereof. The favored PCCD has a cis/trans formula.

The linear PCCD polyester is prepared by the condensation reaction of CHDM and DMCD in the presence of a catalyst wherein the starting DMCD has a trans-cis ratio greater than the equilibrium trans-cis ratio. The resulting prepared PCCD polyester has a trans-cis ratio of repeating polymer units derived from the respective starting DMCD which has a trans-cis ratio substantially equal to the respective starting trans-cis ratio for enhancing the crystallinity of the resulting PCCD.

Preferably the amount of catalyst present is less than about 200 ppm. Typically, catalyst may be present in a range from about 20 to about 300 ppm. The most preferred materials are blends where the polyester has both cycloaliphatic diacid and cycloaliphatic diol components specifically polycyclohexane dimethanol cyclohexyl dicarboxylate (PCCD).

The preferred polyesters are preferably low molecular weight polyester polymers have an intrinsic viscosity (as measured in 60:40 solvent mixture of phenol/tetrachloroethane at 25° C.) ranging from about 0.1 to about 1.5 deciliters per gram. Polyesters branched or unbranched and generally will have a weight average molecular weight of from about 5,000 to about 150,000, preferably from about 8,000 to about 95,000 as measured by viscosity measurements in Phenol/tetrachloroethane (60:40, volume/volume ratio) solvent mixture. It is contemplated that the polyesters have various known end groups.

The polyester composition comprises a phosphorous containing compound. In one embodiment the phosphorus containing compound is an organic or inorganic compound containing phosphorus. The phosphorous containing compounds include but are not limited to elemental phosphorous, organic phosphonic acids, phosphonates, phosphinates, phosphinites, phosphine oxides such as triphenylphosphine oxide, phosphines, phosphites and phosphates and combinations thereof.

Non limiting examples of phosphites and phosphonites include triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite tristearyl sorbitol triphosphite, and tetrakis(2,4-di-tert-butylphenyl)4,4'-biphenylene diphosphonite.

Examples of suitable inorganic phosphates are the alkali metal (including ammonium)phosphates, alkali metal hydrogen phosphates, alkali metal pyrophospates and the like. In one embodiment the inorganic phosphate may be combined with boron phosphate. The phosphinic salts are prepared in an aqueous medium, they are substantially monomeric compounds. Depending on the reaction conditions, polymeric phosphinic salts can also sometimes be produced. Examples of phosphinic acids include but are not limited to dimethylphosphinic acid, ethylmethylphosphinic acid, diethylphosphinic acid, methyl-n-propylphosphinic acid, methanedi(methylphosphinic acid), benzene-1,4-di(methylphosphinic acid), methylphenylphosphinic acid, diphenylphosphinic acid and their salts In an alternate embodiment the phosphorous containing compounds are those of the general formula: $O=P-(OZ)_3$, and nitrogen analogs of these phosphorous compounds. Each Z represents the same or different radicals including hydrocarbon radicals such as alkyl, cycloalkyl, aryl, alkyl substituted aryl and aryl substituted alkyl; halogen, hydrogen, and combinations thereof.

Non limiting examples of suitable phosphates include phenylbisdodecyl phosphate, phenylbisneopentyl phosphate, phenylethylene hydrogen phosphate, phenyl-bis-3,5,5'-trimethylhexyl phosphate, ethyldiphenyl phosphate, 2-ethylhexyl di(p-tolyl), phosphate, diphenyl hydrogen phosphate, triarylphosphine oxides, aromatic phosphates, aromatic diphosphates, bis(2-ethyl-hexyl)p-tolylphosphate, tritolyl phosphate, bis(2-ethylhexyl)-phenyl phosphate, tri(nonylphenyl) phosphate, phenyl-methyl hydrogen phosphate, di(dodecyl) p-tolyl phosphate, tricresyl phosphate, triphenyl phosphate, isopropylated triphenyl phosphate, halogenated triphenyl phosphate, dibutylphenyl phosphate, 2-chlorethyldiphenyl phosphate, p-tolyl bis(2,5,5'-trimethylhexyl)phosphate, 2-ethylhexyldiphenyl phosphate and the like.

In one embodiment the phosphates are triphenyl phosphate, the alkylated triphenyl phosphates, including isopropylated and butylated triphenyl phosphates, bis-neopentyl piperidinyl diphosphate, tetraphenyl bisphenol-A diphosphate, tetraphenyl resorcinol diphosphate, hydroquinone diphosphate, bisphenol-A diphosphate, bisphenol-A polyphosphate, derivatives and mixtures thereof. Illustrative examples of triarylphosphine oxides include triphenylphosphine oxide, tritolylphosphine oxide, trinonylphosphine oxide and trinaphtylphosphine oxide.

In one embodiment the aromatic phosphate are diphosphates and polyphosphates of the following structure IV

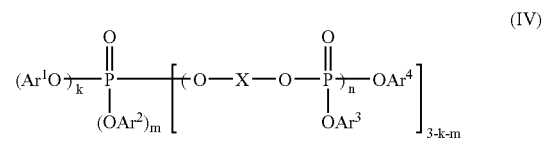

(IV)

wherein $Ar^1$, $Ar^2$, $Ar^3$, $Ar^4$, are independently aromatic groups for examples phenyl group, a tolyl group, a xylyl group, a cumenyl group, a mesityl group, a naphtyl group, an indenyl group, an anthryl group, and the like. Y represents O, S, $SO_2$, $C(CH_3)_2$, $CH_2$ and CHPh, where Ph represents a phenyl group, n is an integer equal to or greater than 0; k, m are integers equal to or greater than 0 and less than or equal to 2, and k+m is an integer equal to or greater than 0 and less than or equal to 2. Preferably, k, m are integers equal to or greater than 0 and less than or equal to 1. More preferably, k, m are both 1. $R^5$-$R^{12}$ may independently be hydrogen, alkyl groups having about 1-20 carbon atoms.

The aromatic diphosphates that may be employed in this invention have the structure V

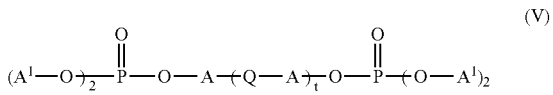

(V)

wherein each A and $A^1$ are independently a substituted or unsubstituted aliphatic, alicyclic or aromatic radical and Q is a covalent bond linking a carbon in each A or a bridging radical selected from the group consisting of $CH_2$, $C(CH_3)_2$, S, $SO_2$, CO,O and N=N and t is an integer from 0 to 4.

In one embodiment the phosphorus containing compound could be an ammonium polyphosphaste, polyphosphazene, phosphate, phosphonate, phosphinate, phosphine oxide, and the like. The ammonium polyphosphate is a compound expressed by a general formula $(NH_4)_{n+2}P_nO_{3n+1}$ (where n is an integer of 20-1000).

Melamine phosphate, dimelamine phosphate, melamine pyrophosphate, melamine polyphosphates, melam polyphosphates, melem polyphosphates and/or melon polyphosphates, zinc phosphate are some of the non limiting examples. In one embodiment phosphorus containing compounds may contain a phosphorus-nitrogen bond include phosphonitrilic chloride, phosphorus ester amides, phosphoric acid amides, phosphonic acid amides, and phosphinic acid amides. Bisphosphoramide materials derived from piperazine and hydroxyaromatic compounds are especially useful. In a preferred embodiment the phosphorus containing compound is selected from the group consisting of organic phosphinates, phosphonates or phosphates, so organic phosphorus containing compounds with at least one OR-group attached to the P (R can be H, (substituted) alkyl or aryl). Especially organic phosphates as e.g. tetraphenyl bisphenol-A diphosphate, are of interest.

The resin composition of the present invention further comprises a mineral-like stabilizer and an organic compound comprising at least one functional group. The mineral-like stabilizers include but are not restricted to materials of natural or synthetic and mineral or non-mineral origin, and of any configuration, such as spheres, plates or fibers, flakes, whiskers, which are available as fine particulate solids. Small particle sizes are of particular value, because high particle sizes often results in bad mechanical properties. So preferred particle sizes (D50) of the stabilizers are below 100 micron, more preferred are below 30 micron, while particle sizes below 10 micron can give even better properties. Nano-size particle sizes also gives often extra-ordinary results. These stabilizers also have sufficient thermal resistance to maintain their solid physical structure at least at the processing temperature of the particular polymeric material to be compounded therewith. Typical stabilizers include calcium hydroxyapatite, boehmite, calcium carbonate, barium carbonate, calcium sulfate, barium sulfate, calcium hydrogenphosphate, barium hydrogenphosphate, calcium (meta)borate, barium (meta)borate, hydrotalcite, aluminium phosphate, wollastonite, dolomite, calcium titanate, barium titanate, calcium silicat, aluminosilicates including Vermiculite, bentonite (bentonite, clay, montmorillonite, Na-montmorillonite, Ca-montmorillonite, hydrated sodium calcium aluminum magnesium silicate hydroxide, pyrophyllite, magnesium aluminum silicate, lithium aluminium silicates, zirconium silicates, Silica which includes precipitated or hydrated, fumed or pyrogenic, viterous or fused or colloidal, hydroxides of aluminium or ammonium or magnesium, zirconia, nanoscale titania, and combinations thereof.

In one embodiment the stabilizers to be used according to the invention is at least one selected from the group consisting of calcium carbonate, barium carbonate, calcium sulfate, barium sulfate, calcium hydroxyapatite, boemite, calcium hydrogenphosphate, aluminum phosphate, barium hydrogen phosphate, calcium metaborate, barium metaborate, tadolomite, hydrotalcite, wollastonite, titanates of calcium and barium, and combination thereof. In yet another embodiment of the present invention the stabilizer is at least one of calcium hydroxyapatite, boehmite, calciumcarbonate and barium carbonate. In yet another embodiment the preferred stabilizer is calcium hydroxyapatite, a tribasic calciumphosphate.

The organic compound comprising at least one functional group is selected from the group consisting of aliphatic or aromatic compounds. The functional group is selected from the group consisting of epoxy, carbodiimide, orthoesters, anhydrides, oxazoline, imidazoline. In a preferred embodiment the functional group is selected from the group consisting of epoxy, carbodiimide, orthoester.

In one embodiment the organic compound comprising at least one functional group is selected from the group consisting of epoxy and orthoester. In one embodiment the organic compound comprising at least one functional group is of the structure VI

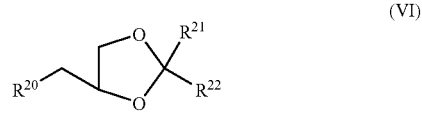

(VI)

wherein $R^{20}$, $R^{21}$, $R^{22}$ are independently at any occurrence an alkyl, alkoxy, aromatic, aryloxy, hydroxy, or hydrogen and with R21 or R22 is alkoxy or aryloxy or hydroxy. In yet another embodiment the organic compound containing at least one functional group is of the structure VII

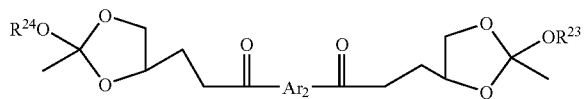

(VII)

wherein $R^{23}$, $R^{24}$ are independently at each occurrence selected from the group consisting of alkyl, aromatic, hydrogen and $Ar_2$ is an aromatic radical.

The amounts of the various components are conveniently expressed in terms weight percent (wt %) of the polyester phosphorous containing compound, stabilizer and organic compound comprising at least one functional group present and are based on the total amount of polyester. Typically the phosphorus containing compound is generally present in an amount corresponding between about 2 to about 30 weight percent based on the amount of polyester. In another embodiment the phosphorus containing compound is generally present in amount corresponding between about 5 to about 20 weight percent based on the amount of polyester.

The mineral like stabilizer is present in an amount corresponding between about 0 weight percent to about 15 weight percent based on the amount of polyester. In one embodiment the stabilizer is present in an amount corresponding between about 0.1 weight percent to about 10 weight percent based on the amount of polyester. In a preferred embodiment the stabilizer is present in an amount corresponding between about 0.5 weight percent to about 5 weight percent based on the amount of polyester. The organic compound comprising at least one functional group is present in an amount corresponding between about 0 weight percent to about 15 weight percent relative to the amount of polyester. In one embodiment of the present invention the amount of the organic compound comprising at least one functional group is present in an amount corresponding between about 0.1 weight percent to about 10 weight percent relative to the amount of polyester. In yet another embodiment, the organic compound comprising at least one functional group is present in an amount corresponding between about 0.5 weight percent to about 10 weight percent relative to the amount of polyester.

The polyester composition of the present invention may further comprise a nitrogen compound. The nitrogen compound used in the invention is not particularly limited as long as it is an organic or inorganic compound containing nitrogen. In one embodiment the nitrogen compound may be an optional component of the polyester composition. Non limiting representative examples of the nitrogen compound may be nitrogen-containing compounds, such as amines, amides, azo compounds, compounds having a triazine ring, salts formed by ionic bonding of a plurality of the same or difference compounds selected from the aforementioned triazine ring compounds, compounds formed through condensation of a plurality of the same or different compounds selected therefrom, and the like. Compounds having triazine rings may be, for example, cyanuric acid, 2-methyl-4,6-diamino-triazine, 2,4d-dimethyl-6-amino-triazine, 2-methy-4,6-dihydroxy-triazine, 2,4-dimehtyl-6-hydroxy-triazine, trimethyl triazine, tris(hydroxymethyl)triazine, tris(1-hydroxyethyl) triazine, tris(2-hydroxyethyl)triazine, isocyanuiic acid, tris (hydroxymethyl)isocyanurate, tris(1-hydroxyethyl)isocyanurate, tris(2-hydroxyethyl)isocyanurate, triallyl isocyanurate, and the like.

Besides, melamine and the like are also included in the nitrogen compounds. The melamine and the like refer to melamine, melamine derivatives, compounds having a similar structure to that of melamine, condensations of melamine, and the like. For example, melamine, ammeride, ammerine, benzoguanamine, acetoguanamine, formoguanamine, guanyl melamine, cyanomelamine, aryl guanamine, melam, melem, melon, succinoguanmine, adipoguanamine, methylglutaroguanamine, melamine phosphate, and the like. The nitrogen compound used in the invention is preferably cyanuric acid, isocyanuric acid, melamine, melamine cyanurate, melamine phosphate, melamine pyrophosphate, melamine polyphosphate and the like.

In one embodiment the nitrogen compounds have the structure(VIII) and can be mixtures of these

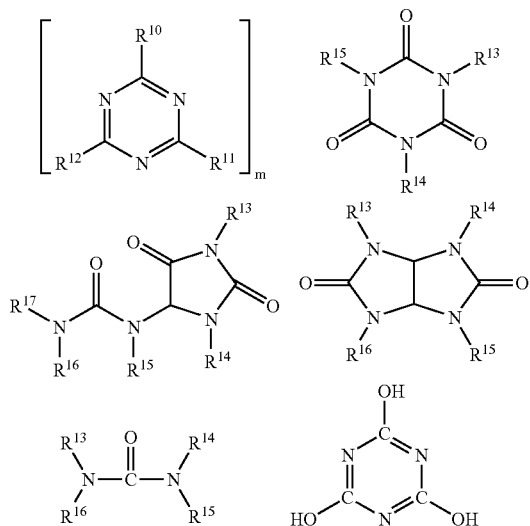

where $R^{10}$ to $R^{12}$ are $NH_2$, C1-C8-alkyl, C5-C16-cycloalkyl or -alkylcycloalkyl, unsubstituted or substituted with a hydroxyl function or with a C1-C4-hydroxyalkyl function, C2-C8-alkenyl, C2-C8-alkoxy, -acyl or -acyloxy, C6-C12-aryl or -arylalkyl, —$OR^8$ or —$N(R^8)R^{13}$, or else N-alicyclic or N-aromatic systems, $R^8$ is hydrogen, C1-C8-alkyl, C5-C16-cycloalkyl or -alkyl-cycloalkyl, unsubstituted or substituted with a hydroxy function or with a C1-C4-hydroxyalkyl function, or is C2-C8-alkenyl, C1-C8-alkoxy, -acyl, or acyloxy, or C6-C12-aryl or -arylalkyl, $R^{13}$ to $R^{17}$ are the groups of $R^8$, or else —O—$R^8$, m and n, independently of one another, are 1, 2, 3, or 4, X is acids which can form adducts with triazine compounds (VIII), $R^{13}$ to $R^{17}$ are groups identical with $R^8$ or else —O—$R^8$, m and n, independently of one another, are 1, 2, 3 or 4, X are acids which can form adducts with triazine compounds (VIII); or the nitrogen compounds are esters of tris(hydroxyethyl)isocyanurate with aromatic polycarboxylic acids or are nitrogen-containing phosphates of the formula $(NH_4)_y H_{3-y} PO_4$ or $(NH_4 PO_3)z$, where y is from 1 to 3 and z is from 1 to 10,000.

In a preferred embodiment the nitrogen containing compounds are selected from the group consisting of melamine compounds as melamine cyanurate.

Typically the nitrogen containing compound is generally present in amount corresponding between about 0 to about 20 weight percent based on the amount of polyester. In another embodiment the nitrogen containing compound is generally present in amount corresponding between about 2 to about 15 weight percent based on the amount of polyester.

In one embodiment of the present invention the polyesters are prepared by melt processes that are well known to those skilled in the art and consist of several steps. The first reaction step is generally done under a nitrogen sweep with efficient stirring and the reactants may be heated slowly or quickly. Appropriate reaction conditions for a variety of acid-glycol polymerizations are known in the art. Any polymerization temperature which gives a clear melt under the addition conditions and affords a reasonable rate of polymerization without unwanted amount of side reaction and degradation may be used. In one embodiment the temperature of the reaction is between about 175° C. and about 350° C. In another embodiment the temperature is between about 200° C. and about 300° C. The reaction is maintained in this stage for 0.5 to 3 hours with the condensation reaction of amidation and esterification taking place. In one embodiment the reaction is then carried out under vacuum of about 0.1 Torr while the reaction occurs and copolyester of desired molecular weight is built. In one embodiment the polyester is recovered in the last step by either cooling and isolating the polymer and grinding or by extruding the hot polymer melt, cooling and pelletizing.

In one embodiment the above polyesters with from about 1 to about 50% by weight, of units derived from polymeric aliphatic acids and/or polymeric aliphatic polyols to form copolyesters. The aliphatic polyols include glycols, such as poly(ethylene glycol) or poly(butylene glycol). In another embodiment suitable copolymeric polyester resins include, e.g., polyesteramide copolymers, cyclohexanedimethanol-terephthalic acid-isophthalic acid copolymers and cyclohexanedimethanol-terephthalic acid-ethylene glycol ("PCTG") copolymers. The polyester component may be prepared by procedures well known to those skilled in this art, such as by condensation reactions. The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $Ti(OC_4H_9)_6$ in n-butanol in a suitable amount, typically about 50 ppm to about 200 ppm of titanium based upon the final product.

In one embodiment the catalysts include, but are not limited to metal salts and chelates of Ti, Zn, Ge, Ga, Sn, Ca, Li and Sb. Other known catalysts may also be used for this step-growth polymerization. Examples of the esterification catalysts, which may be employed in the above melt reaction process include titanium alkoxides such as tetramethyl, tetraethyl, tetra(n-propyl), tetraisopropyl and tetrabutyl titanates; dialkyl tin compounds, such as di-(n-butyl)tin dilaurate. di-(n-butyl)tin oxide and di-(n-butyl) tin diacetate; and oxides acetate salts and sulfate salts of metals, such as magnesium, calcium, germanium, zinc, antimony, etc. Conveniently titanium alkoxides are employed. The catalyst level is employed in an effective amount to enable the copolymer formation and is not critical and is dependent on the catalyst that is used. Generally the catalyst is used in concentration ranges of about 10 to about 500 ppm, preferably about 20 to about 4500 ppm and most preferably about 50 to about 400 ppm.

The reaction may be conducted optionally in presence of a solvent or in neat conditions without the solvent. The organic solvent used in the above process according to the invention should be capable of dissolving the diimde, the copolymer resulting from the reactions between the diimide, diol, and diacid or diester to an extent of at least 0.01 g/per ml at 25° C. and should have a boiling point in the range of 140-290° C. at atmospheric pressure. Preferred examples of the solvent include but are not limited to amide solvents, in particular, N-methyl-2-pyrrolidone; N-acetyl-2-pyrrolidone; N,N'-dimethyl formamide; N,N'-dimethyl acetamide; N,N'-diethyl acetamide; N,N'-dimethyl propionic acid amide; N,N'-diethyl propionic acid amide; tetramethyl urea; tetraethyl urea; hexamethylphosphor triamide; N-methyl caprolactam and the like. Other solvents may also be employed, for example, methylene chloride, chloroform, 1,2-dichloroethane, tetrahydrofuran, diethyl ether, dioxane, benzene, toluene, chlorobenzene, and the like.

The composition of the present invention may include additives which do not interfere with the previously mentioned desirable properties but enhance other favorable properties such as anti-oxidants, flame retardants, reinforcing materials, colorants, mold release agents, fillers, nucleating agents, UV light and heat stabilizers, lubricants, and the like. Additionally, additives such as antioxidants, minerals such as talc, clay, mica, and other stabilizers including but not limited to IJV stabilizers, such as benzotriazole, supplemental reinforcing fillers such as flaked or milled glass, and the like, flame retardants, pigments or combinations thereof may be added to the compositions of the present invention. The additive can be present in an amount between about 0 and about 50 weight percent.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 1 to 30 percent by weight based on the weight of resin. A preferred range will be from about 5 to 20 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly(haloaryl acrylate), poly(haloaryl methacrylate), or mixtures thereof. Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially preferred is antimony trioxide ($Sb_2O_3$). Synergists such as antimony oxides, are typically used at about 0.1 to 10 by weight based on the weight percent of resin in the final composition. Also, the final composition may contain polytetrafluoroethylene (PTFE) type resins or copolymers used to reduce dripping in flame retardant thermoplastics.

Also other halogen-free flame retardants than the mentioned P or N containing compounds can be used, non limiting examples being compounds as Zn-borates, hydroxides or carbonates as Mg— and/or Al-hydroxides or carbonates, Si-based compounds like silanes or siloxanes, Sulfur based compounds as aryl sulphonates (including salts of it) or sulphoxides, Sn-compounds as stannates can be used as well often in combination with one or more of the other possible flame retardants.

Other additional ingredients may include antioxidants, and UV absorbers, and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amyl-hydroquinone, 2,6-diphenyl-4octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene; vi) acylaminophenols, for example, 4-hydroxy-lauric acid anilide; vii) esters of beta-(3,5-di-tert-butyl-4-hydroxyphenol)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl)propionic acid with mono-or polyhydric alcohols, e.g., with methanol, diethylene glycol, octadecanol, triethylene glycol, 1,6-hexanediol, pentaerythritol, neopentyl glycol, tris(hydroxyethyl)isocyanurate, thiodiethylene glycol, N,N-bis(hydroxyethyl)oxalic acid diamide. Typical, UV absorbers and light stabilizers include i) 2-(2'-hydroxyphenyl)-benzotriazoles, for example, the 5'methyl-3',5'-di-tert-butyl-,5'-tert-butyl-,5'(1,1,3,3-tetramethylbutyl)-,5-chloro-3',5'-di-tert-butyl-,5-chloro-3'tert-butyl-5'methyl-,3'sec-butyl-5'tert-butyl-,4'-octoxy,3',5'-ditert-amyl-3',5'-bis-(alpha, alpha-dimethylbenzyl)-derivatives; ii) 2.2 2-Hydroxy-benzophenones, for example, the 4-hydroxy-4-methoxy-,4-octoxy,4-decloxy-,4-dodecyloxy-,4-benzyloxy,4,2',4'-trihydroxy- and 2'hydroxy-4,4'-dimethoxy derivative, and iii) esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate.

Dyes or pigments may be used to give a background coloration. Dyes are typically organic materials that are soluble in the resin matrix while pigments may be organic complexes or even inorganic compounds or complexes which are typically insoluble in the resin matrix. These organic dyes and pigments include the following classes and examples: furnace carbon black, titanium oxide, zinc sulfide, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others.

The polyester composition of the present invention can be blended with conventional thermoplastics. Examples of materials suitable for use as thermoplastic material that can be blended with the polyester composition include, but are not limited to, amorphous, crystalline, and semi-crystalline thermoplastic materials such as: polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate (PMMA), methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and tetrafluoroethylenes (e.g., Teflons) and mixtures, copolymers, reaction products, blends and composites comprising at least one of the foregoing polymers. In one embodiment, the polymer resin can be homopolymers or copolymers of one of polyolefins, polycarbonates, polyesters, polyphenylene ethers and styrenic polymers, or a mixture thereof. In another embodiment the polymer resin comprises a polyolefin selected from the group consisting of polyethylene, polypropylene, polybutylene, homopolymers, copolymers and mixtures thereof. In yet another embodiment of the present invention the polymer resin comprises polycarbonate and mixtures, copolymers, reaction products, blends and composites comprising polycarbonate.

The method of blending can be carried out by conventional techniques. The production of the compositions may utilize any of the blending operations known for the blending of thermoplastics, for example blending in a kneading machine such as a Banbury mixer or an extruder. To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device. In one embodiment the blend synthesized by melt mixing process the pre mixing is carried out at a temperature range of between about 200° C. to about 375° C. The heating or melt mixing is typically carried out at a temperature range of about 250° C. to about 300° C.

In one embodiment of the present invention the thermoplastic composition could be prepared by solution method. The solution method involves dissolving all the ingredients in a common solvent (or) a mixture of solvents preferably an organic solvent, which is substantially inert towards the polymer, and will not attack and adversely affect the polymer and either precipitation in a non-solvent or evaporating the solvent either at room temperature or a higher temperature of at least about 50° C. to about 80° C. Some suitable organic solvents include ethylene glycol diacetate, butoxyethanol, methoxypropanol, the lower alkanols, chloroform, acetone, methylene chloride, carbon tetrachloride, tetrahydrofuran, and the like. In one embodiment of the present invention the non solvent is at least one selected from the group consisting of mono alcohols such as ethanol, methanol, isopropanol, butanols and lower alcohols with C1 to about C12 carbon atoms. In one embodiment the solvent is chloroform.

The composition of the present invention can be molded into useful articles by a variety of means by many different processes to provide useful molded products such as injection, extrusion, rotation, foam molding calender molding and blow molding and thermoforming, compaction, melt spinning form articles. The thermoplastic composition of the present invention has additional properties of good mechanical properties, color stability, oxidation resistance, good flame retardancy, good processability, i.e. short molding cycle times, thermal properties. Non limiting examples of the various articles that could be made from the thermoplastic composition of the present invention include electrical connectors, electrical devices, computers, building and construction, outdoor equipment.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. While only certain features of the invention have been illustrated and described herein, many modifications and changes will occur to those skilled in the art. Accordingly, these examples are not intended to limit the invention, as defined in the appended claims, in any manner.

Izod Unnotched Impact Strength was measured in accordance with ISO 180, and results are expressed in units of kJ/m2. The molded specimen before and after 3 weeks aging at 150 C or after 6 weeks at 140 C in an oven were tested for the impact strength studies. The weight average molecular weight weights were obtained from Gel permeation chromatography using polystyrene standards and a mixture of hexafluoroisopropanol and chloroform as solvent. The flexural strength measurements were done in accordance with ISO 178, and results are expressed in units of MPa. Property retention was expressed as the ratio of the property after aging to initial property multiplied by 100.

Preparation of Orthoester

Example: A 1-liter round-bottomed flask was equipped with a pressure equalizing addition funnel was flushed with nitrogen and charged with 41.5 grams (451 mmol.) of glycerol, 750 ml. of methylene chloride and 100 mg. of p-toluenesulfonic acid. Trimethyl orthoacetate, 56.9 grams (473 mmol), was added over 5 minutes at room temperature, with stirring. The stirring was continued for 18 hours followed by addition of 1 gram of anhydrous sodium carbonate. The mixture was stirred for one additional hour and filtered. The solvent was stripped under vacuum to yield 65 grams (97% of theoretical) of 4-hydroxymethyl-2-methoxy-2-methyl-1,3-dioxolane as a clear oil. Its molecular structure was confirmed by proton and carbon-13 nuclear magnetic resonance spectroscopy. A 3-necked 2 liter round-bottomed flask was equipped with a mechanical stirrer, condenser, thermometer, and addition funnel. The flask was charged with 0.5 g methyltrialkylammonium chloride, 100 mL chloroform, 30 mL distilled water, and 32 g of 50 percent aqueous sodium hydroxide. The flask was immersed in a ice-water bath and cooled to approximately 10° C. while stirring rapidly followed by addition of 30 g (0.2 mol) 4-hydroxymethyl-2-methoxy-2-methyl-1,3-dioxolane. A solution of 20.2 g terephthaloyl chloride (0.1 mol) in chloroform was added to the flask through the addition funnel over a 60 minute period maintaining the reaction temperature at approximately 10° C. or lower. After the addition of the acid chloride was complete, the reaction was stirred for additional 60 minutes. The layers were separated and the chloroform layer was washed twice with 500 mL distilled water, dried over anhydrous sodium sulfate and vacuum stripped to yield the product.

Preparation of Polyesters

Poly(1,4-butylene terephthalate) (PBT) was obtained from General Electric Company as PBT-315 having a weight average molecular weight of about 120,000 AMU as measured by gel permeation chromatography using polystyrene standards and a mixture of hexafluoroisopropanol with chloroform as solvent. Melamine cyanurate was obtained from DSM as MC25, tetraphenyl bisphenol A-diphosphate (BPA-DP) was obtained from Albemarle as NcendX P-30. A 50:50 w/w blend of polytetrafluoroethylene and styrene acrylonitrile copolymer (TSAN) was obtained from General Electric Company as TSAN. The hindered phenol antioxidant was obtained from Ciba Geigy as IRGANOX® 1010. Chopped glass strand was obtained from Nippon Electric Glass as NEG T120 having a diameter of about 13 micron and a sizing for compatibility with PBT. The ECN-masterbatch in PET (ECN) has been made by melt blending of 25% ECN 1299, obtained from Ventico, with 75% of PET.

Example. The polyesters were made by dry-blending of ingredients with exception of BPA-diphosphate and glass fiber. The polyesters were subsequently compounded on a WP 25 mm co-rotating extruder, where BPA-DP and Glass were fed separately down-stream the extruder. The polyester was compounded at 270° C. on a WP25 mm co-rotating twin screw extruder, yielding a pelletized composition. Compounding was carried out at a feed rate of about 15 kilo gram per hour and a screw speed of about 300 rotations per minute. Temperature settings of the extruder for the different barrels were 50-150-260-260-260-260-260-260 to 275° C. at a pressure of 0.2 bar. The resulting pellets were dried for at least four hours at 120° C. before injection molding into ASTM/ISO test specimens on an 80 ton, four oz. injection molding machine operated at a temperature of about 280° C. The formulations have been blended, compounded and molded with the following compositions: PBT (IV=1.2) or PET (IV=0.8), 8.5% melamine cyanurate, 0.4 (PET based formulations) or 0.5% TSAN (PBT based formulations), 16% BPA-DP, 0.15% hindered phenol stabilizer, 30% Glass fiber, and 0-1.5% bisorthoester (PBT based formulations), or 0-7% of ECN-masterbatch in PET (25/75) (PET formulations) and 0-2% calcium hydroxyapatite (PET formulations). Molding is done on a Engel 75 tons with temperature setting of 50-250-255-265-255 (from throat to nozzle) and a mold temperature of 70° C. Prior to molding the pellets were pre-dried at 120° C. for 4 hours.

TABLE 1

PBT

| | Ex. 1 0.5% ECN | Ex. 2 1.5% ECN | Ex. 3 0.5% Bis-Ortho Ester | Ex. 4 1.5% Bis-Ortho Ester | C Ex. 1 Control |
|---|---|---|---|---|---|
| PBT | 44.35 | 43.4 | 44.4 | 43.4 | 44.85 |
| Glass fiber | 30.00 | 30.0 | 30.0 | 30.0 | 30.00 |
| Irganox 1010 | 0.15 | 0.15 | 0.15 | 0.15 | 0.15 |
| TSAN | 0.50 | 0.5 | 0.5 | 0.5 | 0.50 |
| MC | 8.50 | 8.5 | 8.5 | 8.5 | 8.50 |
| BPADP | 16.00 | 16.0 | 16.0 | 16.0 | 16.00 |
| ECN | 0.50 | 1.50 | 0.00 | 0.00 | 0.00 |
| Bis-Ortho Ester | 0.00 | 0.0 | 0.5 | 1.5 | 0.00 |
| Total | 100 | 100 | 100 | 100 | 100 |
| IUI, kJ/m$^2$ | 46.1 | 47.8 | 43.3 | 42.8 | 45.4 |
| IUI, Aged (150° C., weeks) | 16.1 | 21.0 | 18.1 | 14.8 | 8.9 |
| IUI Retention, % | 34.9 | 44.0 | 41.7 | 34.5 | 19.6 |

TABLE 2

PET

| | Flexural Strength Retention | | | | Izod Unnotched Impact Retention | | | |
|---|---|---|---|---|---|---|---|---|
| CaHA | 0% ECN | 3% ECN | 5% ECN | 7% ECN | 0% ECN | 3% ECN | 5% ECN | 7% ECN |
| 0 | 59.8 | 69.3 | 74.4 | 75.4 | 24.5 | 30.5 | 35.7 | 34.6 |
| 1 | 61.1 | 74.9 | 79.1 | 81.7 | 27.7 | 32.0 | 39.1 | 33.1 |
| 2 | 70.7 | 77.8 | 79.7 | 80.3 | 31.1 | 33.0 | 40.0 | 36.7 |

TABLE 3

Molecular Weight Retention

| CaHA | 0% ECN | 3% ECN | 5% ECN | 7% ECN |
|---|---|---|---|---|
| 0 | 52.9 | 71.5 | 73.0 | 74.0 |
| 1 | 62.2 | 87.5 | 81.3 | 76.1 |
| 2 | 70.1 | 103.8 | 86.7 | 96.9 |

The polyesters shown in Tables 1-3 are found to have a better property retention after heat aging in the presence of at least 1 of the stabilizers and/or compound with a functional group. A combination of the mineral-like stabilizer with a compound having a functional group shows even a synergistic effect in property retention.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A polyester composition comprising
a) a polyester;
b) a phosphorous containing compound, wherein said phosphorous compound is at least one selected from the group consisting of organic phosphinates, phosphonates, and phosphates;
c) a mineral-like stabilizer, wherein said mineral-like stabilizer is selected from the group consisting of calcium hydroxyapatite, boehmite, calcium carbonate, barium carbonate, calcium sulfate, barium sulfate, calcium hydrogen phosphate, barium hydrogen phosphate, calcium (meta)borate, barium (meta)borate, hydrotalcite, aluminium phosphate, wollastonite, dolomite, calcium titanate, barium titanate and glass fiber; and
d) an orthoester.

2. A polyester composition comprising
a) a polyester;
b) a phosphorous containing compound;
c) a mineral-like stabilizer, wherein said mineral-like stabilizer is selected from the group consisting of calcium hydroxyapatite, glass fibers, and a combination thereof and
d) an orthoester.

3. A polyester composition comprising
a) a polyester;
b) a phosphorous containing compound;
c) a mineral-like stabilizer, wherein said mineral-like stabilizer is selected from the group consisting of calcium hydroxyapatite, boehmite, calcium carbonate, barium carbonate, calcium sulfate, barium sulfate, calcium hydrogen phosphate, barium hydrogen phosphate, calcium (meta)borate, barium (meta)borate, hydrotalcite, aluminium phosphate, wollastonite, dolomite, calcium titanate, barium titanate and glass fiber;
d) an orthoester; and
e) a nitrogen compound, wherein said nitrogen compound is at least one selected from the group consisting of cyanuric acid, isocyanuric acid, melamine, melamine cyanurate, melamine phosphate, melamine pyrophosphate, and melamine polyphosphate.

4. A polyester composition comprising
a) a polyester;
b) a phosphorous containing compound;
c) a mineral-like stabilizer, wherein said mineral-like stabilizer is selected from the group consisting of calcium hydroxyapatite, boehmite, calcium carbonate, barium carbonate, calcium sulfate, barium sulfate, calcium hydrogen phosphate, barium hydrogen phosphate, calcium (meta)borate, barium (meta)borate, hydrotalcite, aluminium phosphate, wollastonite, dolomite, calcium titanate, barium titanate and glass fiber;
d) an orthoester; and
e) a nitrogen compound, wherein said nitrogen compound is present in an amount between about 2 to about 20 weight percent based on the amount of the polyester.

5. The composition according to claims 1, 2, 3, or 4, wherein the polyester is at least one selected from the group consisting of polybutyleneterephthalate, polyethyleneterephthalate, and polypropyleneterephthalate.

6. The composition according to claims 1, 2, 3, or 4, wherein said phosphorous compound is an organic phosphate.

7. The composition according to claims 1, 2, 3, or 4, wherein said phosphorous containing compound is present in an amount between about 2 and about 30 weight percent based on the amount of the polyester.

8. The composition according to claims 1, 2, 3, or 4, wherein said mineral-like stabilizer is present in an amount between about 0.1 and about 15 weight percent based on the amount of the polyester.

9. The composition according to claims 1, 2, 3, or 4, wherein said orthoester is present in an amount between about 0.1 to about 15 weight percent, based on the amount of the polyester.

10. The composition according to claims 1, 2, or 3, wherein said composition comprises a nitrogen compound in an amount up to about 20 weight percent based on the amount of polyester.

11. The composition according to claims 1, 2, 3, or 4, further comprising up to about 50 weight percent, based on the weight of the polyester composition, of an additive, wherein said additive is at least one selected from the group consisting of anti-oxidants, flame retardants, reinforcing materials, colorants, mold release agents, fillers, nucleating agents, UV light stabilizers, heat stabilizers, lubricants, anti-oxidants flame retardants, pigments, and combinations thereof.

12. A polyester composition comprising
a) a polyester, wherein said polyester is at least one selected from the group consisting of polybutyleneterephthalate, polyethyleneterephthalate and poplypropyleneterephthalate;
b) an organic phosphate;
c) a mineral-like stabilizer selected from the group consisting of calcium hydroxyapatite and glass fiber; and
d) an orthoester.

13. The composition of claim 12, further comprising a nitrogen containing compound in an amount corresponding to between about 2 to about 15 weight percent based on the amount of polyester.

14. The composition of claim 13, wherein said nitrogen containing compound is melamine cyanurate.

15. The composition of claim 12, wherein the mineral-like stabilizer is calcium hydroxyapatite in an amount of between about 0.1 weight percent to about 10 weight percent based on the amount of polyester, and the orthoester is present in an amount of between about 0.1 weight percent to about 10 weight percent based on the amount of polyester.

16. The composition of claim 15, further comprising a nitrogen containing compound in an amount corresponding to between about 2 to about 15 weight percent based on the amount of polyester.

17. The composition of claim 16, wherein said nitrogen containing compound is melamine cyanurate.

18. The composition of claim 12, wherein the mineral-like stabilizer is glass fibers, and the orthoester is present in an amount of between about 0.1 weight percent to about 10 weight percent based on the amount of polyester.

19. The composition of claim 18, further comprising a nitrogen containing compound in an amount corresponding to between about 2 to about 15 weight percent based on the amount of polyester.

20. The composition of claim 19, wherein said nitrogen containing compound is melamine cyanurate.

* * * * *